(12) United States Patent
Kennedy, Jr.

(10) Patent No.: US 9,739,401 B1
(45) Date of Patent: Aug. 22, 2017

(54) PIPE GRIPPING ELEMENTS AND PIPE JOINT RESTRAINTS INCORPORATING SAME

(71) Applicant: Harold Kennedy & Associates, Inc., Fuquay-Varina, NC (US)

(72) Inventor: Harold Kennedy, Jr., Fuquay-Varina, NC (US)

(73) Assignee: Harold Kennedy & Associates, Inc., Fuquay Varina, NC (US)

( * ) Notice: Subject to any disclaimer, the term of this patent is extended or adjusted under 35 U.S.C. 154(b) by 2 days.

(21) Appl. No.: 15/149,572

(22) Filed: May 9, 2016

(51) Int. Cl.
*F16L 19/07* (2006.01)

(52) U.S. Cl.
CPC .................... *F16L 19/07* (2013.01)

(58) Field of Classification Search
USPC ........ 285/400, 404, 337, 339, 342–343, 374
See application file for complete search history.

(56) References Cited

U.S. PATENT DOCUMENTS

| | | | |
|---|---|---|---|
| 4,092,036 A | 5/1978 | Sato et al. | |
| 4,417,754 A | 11/1983 | Yamaji et al. | |
| 4,627,774 A | 12/1986 | Bradley | |
| 4,647,083 A | 3/1987 | Hashimoto | |
| 4,664,426 A | 5/1987 | Ueki | |
| 4,848,808 A | 7/1989 | Pannell et al. | |
| 5,071,175 A | 12/1991 | Kennedy, Jr. | |
| 5,544,922 A | 8/1996 | Shumard et al. | |
| 5,772,252 A | 6/1998 | Malani | |
| 6,173,993 B1 | 1/2001 | Shumard et al. | |
| 6,322,273 B1 | 11/2001 | Gentile, Jr. | |
| 7,185,924 B1 | 3/2007 | Longacre et al. | |
| 7,266,875 B2 | 9/2007 | Longacre et al. | |
| 7,484,775 B2 | 2/2009 | Kennedy, Jr. | |
| 2011/0291409 A1 | 12/2011 | Kennedy, Jr. et al. | |

*Primary Examiner* — Aaron Dunwoody
*Assistant Examiner* — Fannie Kee
(74) *Attorney, Agent, or Firm* — Myers Bigel, P.A.

(57) ABSTRACT

A pipe gripping element has a T-shaped body including an elongated cross member and a base member extending from the cross member. The cross member includes an upper portion and an opposite lower arcuate portion, and the base member includes an upper portion that is slanted relative to the cross member upper portion to define a fulcrum. An elongated, arcuate tooth extends outwardly from the arcuate portion. A pipe joint restraint includes an annular retainer gland, a plurality of pockets circumferentially spaced around the gland, and a plurality of the pipe gripping elements operably associated therewith for gripping and restraining a pipe.

11 Claims, 20 Drawing Sheets

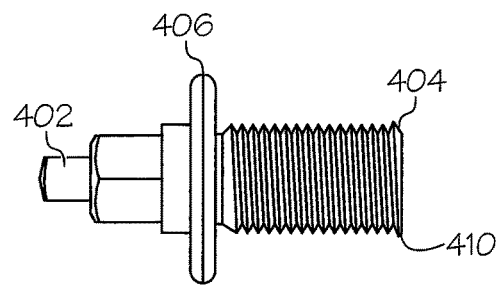
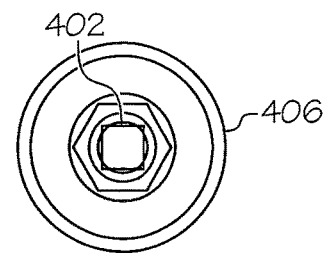
FIG. 15A        FIG. 15B
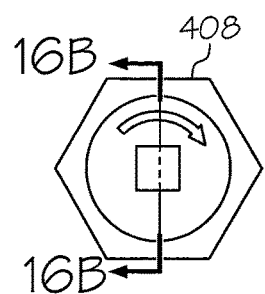
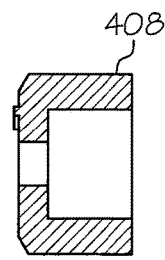
FIG. 16A        FIG. 16B

PIPE GRIPPING ELEMENTS AND PIPE JOINT RESTRAINTS INCORPORATING SAME

FIELD OF THE INVENTION

The present invention relates generally to pipe coupling and, more particularly, to pipe coupling apparatus.

BACKGROUND

It is often necessary to couple together the end of a pipe, such as a water pipe, to another member, such as another pipe, a valve, a fitting, or other similar pipe-like structure. In some cases, the ends of two adjacent pipes may be flanged, and the flanges can be placed into confronting relationship to facilitate bolting the pipes together. This coupling arrangement, however, is not always feasible or available.

A coupling device known as a mechanical joint can be used where one of the pipes does not have an available flanged end. In that situation, the end of the non-flanged pipe is telescopically received into a flared end of a flanged member, with a follower ring situated over the pipe adjacent to the flange. A gasket is provided which is compressed into the pipe surface and against the flare of the other member to create a water-tight seal as the follower ring is bolted to the flange. An exemplary mechanical joint is the Standardized Mechanical Joint (SMJ), which is described in ANSI/AWWA (American National Standards Institute/American Water Works Association) C111/A21.11.

Mechanical joints are suitable for a number of situations, but may not be able to retain a water-tight connection between the pipes when the pipes are subjected to hydraulic thrust forces which tend to cause the pipes to telescope apart, such as pipes utilized in pressurized municipal and industrial water systems. To reduce the risk of such pipes coming apart, pipe joint restraints may be utilized with mechanical joints or other joints. An exemplary pipe joint restraint is illustrated in FIGS. 1 and 2. The end 12 of a first pipe 14, such as a water main pipe, is secured by the pipe joint restraint 16 to the end 18 of a second pipe-like member 20 which may be, for example, another water main pipe or a pipe-like extension of a valve, fitting, fire hydrant, or other similar structure. The pipe joint restraint 16 has an annular retainer gland 22 that is disposed on the outer surface 28 of first pipe 14. The annular retainer gland 22 defines a pipe receiving space 24 therethrough and has an axial centerline 26. The illustrated annular retainer gland 22 includes a front projecting rim 30 which butts up against an annular sealing member 32, such as a gasket, received on outer surface 28 of the first pipe end 12.

The end 18 of the second pipe 20 is flared as at 34 to telescopically receive the first pipe end 12 therein. The flange 36 of pipe end 18 may be secured to the annular retainer gland 22 with T-bolts 38 (only one shown) received through axially-extending holes 40 and 42 on the gland 22 and flange 36, respectively. The gasket 32 is in a recess 44 that is coaxial with the flange 36 and is sized to receive a portion of rim 30 so as to push the gasket 32 into a water-tight sealing relationship with pipe surface 28 and pipe recess 44 as the T-bolts 38 are tightened down.

The annular retainer gland 22 is secured to the first pipe 14 by one or more pipe restraining mechanisms 50. Each pipe restraining mechanism 50 includes a pocket 60 and a pipe engaging assembly 62 cooperatively coupled to pocket 60. Each pipe engaging assembly 62 includes at least one tooth 75 supported on a gripping element 76, an adjustment member 78, which may be in the form of a bolt, and a nut 80 to receive torque to adjust the bolt. A rotation of the bolt 78, such as via nut 80, causes the gripping element 76 to move radially toward or away from the pipe surface 28, depending on rotational direction. The tooth 75 is configured to engage the pipe surface 28 when the gripping element 76 is moved toward the pipe 14, and to thereafter bite into the pipe surface 28 in response to thrust forces tending to move the pipe ends 12, 18 telescopically apart along the centerline 26. The tooth 75 and groove formed thereby resist the tendency of the pipes to move away from the each other.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a pipe gripping element has a T-shaped body including an elongated cross member and a base member extending from the cross member. The cross member includes an upper portion and an opposite lower arcuate portion, and the base member includes an upper portion that is slanted relative to the cross member upper portion to define a fulcrum. In some embodiments, the cross member upper portion has a width greater than a width of the base member upper portion. The cross member upper portion and the base member upper portion are each substantially flat, although non-flat configurations are possible as long as a fulcrum is defined at the intersection thereof.

An elongated, arcuate tooth extends outwardly from the arcuate portion. The tooth includes front and rear walls converging to form a gripping edge. The tooth gripping edge is configured to generally conform to an arcuate shape of an outer surface of a pipe. In some embodiments, the arcuate portion has opposite front and rear edges, and the elongated, arcuate tooth extends outwardly from the arcuate portion between the front and rear edges. In other embodiments, the elongated, arcuate tooth extends outwardly from the arcuate portion at the front edge.

The cross member includes opposite front and rear portions, and the base member extends outwardly from the cross member rear portion. The cross member front portion includes first and second wall portions that are slanted relative to each other, and the second wall portion has a common edge with the cross member upper portion. The base member includes opposite side portions and, in some embodiments, each side portion includes a slot formed therein.

According to some embodiments of the present invention, a pipe joint restraint for coupling pipe ends in fluid communication and holding the pipes against separation includes an annular retainer gland defining a pipe-receiving space therethrough, and a plurality of T-shaped pockets formed within the gland in circumferential spaced-apart relationship. The retainer gland includes a plurality of bolt holes for receiving bolts to fasten the gland to a flange of a member receiving an end of a pipe received in the pipe-receiving space of the gland. The retainer gland also includes a projecting rim having a forward end edge for engaging a sealing member disposed within an internal annular recess of a fitting on a second pipe when the gland is installed on a first pipe.

Each T-shaped pocket has an opening confronting the pipe-receiving space. In addition, each pocket includes a top wall, a front wall, and first, second and third rear walls. The second rear wall is centrally located such that the first and third rear walls are on respective opposite sides of the second rear wall. A plurality of T-shaped pipe gripping elements are received in the pockets. Each pipe gripping element includes an elongated cross member and a base member extending from the cross member. The cross member includes an upper portion and an opposite lower arcuate portion, and the base member includes an upper portion that is slanted relative to the cross member upper portion to define a fulcrum. In some embodiments, the cross member upper portion has a width greater than a width of the base member upper portion. The cross member upper portion and the base member upper portion are each substantially flat, although non-flat configurations are possible as long a fulcrum is defined thereby.

An elongated, arcuate tooth extends outwardly from the arcuate portion. The tooth includes front and rear walls converging to form a gripping edge. The tooth gripping edge is configured to generally conform to an arcuate shape of an outer surface of a pipe. In some embodiments, the arcuate portion has opposite front and rear edges, and the elongated, arcuate tooth extends outwardly from the arcuate portion between the front and rear edges. In other embodiments, the elongated, arcuate tooth extends outwardly from the arcuate portion at the front edge.

The cross member of each gripping element includes opposite front and rear portions, and the base member extends outwardly from the cross member rear portion. The cross member front portion includes first and second wall portions that are slanted relative to each other, and the second wall portion has a common edge with the cross member upper portion. The base member includes opposite side portions and, in some embodiments, each side portion includes a slot formed therein.

A plurality of threaded adjustment members are each threadingly engaged with a respective pocket via a threaded opening in the pocket top wall and each has a flat distal end that is operably associated with a respective gripping element at the fulcrum thereof and adapted to move the gripping element relative to the pocket. In some embodiments, each threaded adjustment member includes a deformable thread at a proximal end thereof that is configured to deform during use of the pipe joint restraint such that each threaded adjustment member is non-removable from a respective pocket top wall. A peripheral edge of the distal end of each respective threaded adjustment member, upon initial contact with a respective gripping element cross member, creates a first center of rotation of the gripping element. The fulcrum creates a second center of rotation of the gripping element upon subsequent contact with the flat distal end of the adjustment member.

In some embodiments, at least one wedge member is positioned between the cross member of each gripping element and a rear wall of each respective pocket. For example, a first wedge member may be positioned between the cross member and the first rear wall of each pocket and a second wedge member may be positioned between the cross member and the third rear wall of each pocket. In some embodiments, the first rear wall includes a recessed portion configured to receive the first wedge member, and the third rear wall comprises a recessed portion configured to receive the second wedge member. In some embodiments, the wedge members are formed of a resilient material, such as rubber, etc. A respective gripping element slides against the wedge members via an adjustment member, and moves into position against a pipe surface in a forward or cocked position, ready to rotate when a separating force is applied. The wedge members are configured to retain the gripping elements within the pockets and prevent the gripping elements from becoming dislodged from the pockets and potentially become lost.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIG. 15A is a side elevation view of a threaded adjustment member of the pipe joint restraint of FIGS. 3 and 4, according to some embodiments of the present invention.

FIG. 15B is a proximal end view of the threaded adjustment member of the threaded adjustment member of FIG. 15A.

FIG. 16A is a top plan view of a torque off nut for use with the threaded adjustment member of FIGS. 15A-15B, according to some embodiments of the present invention.

FIG. 16B is a cross-sectional view of the torque off nut of FIG. 16A.

DETAILED DESCRIPTION

Figure 1:
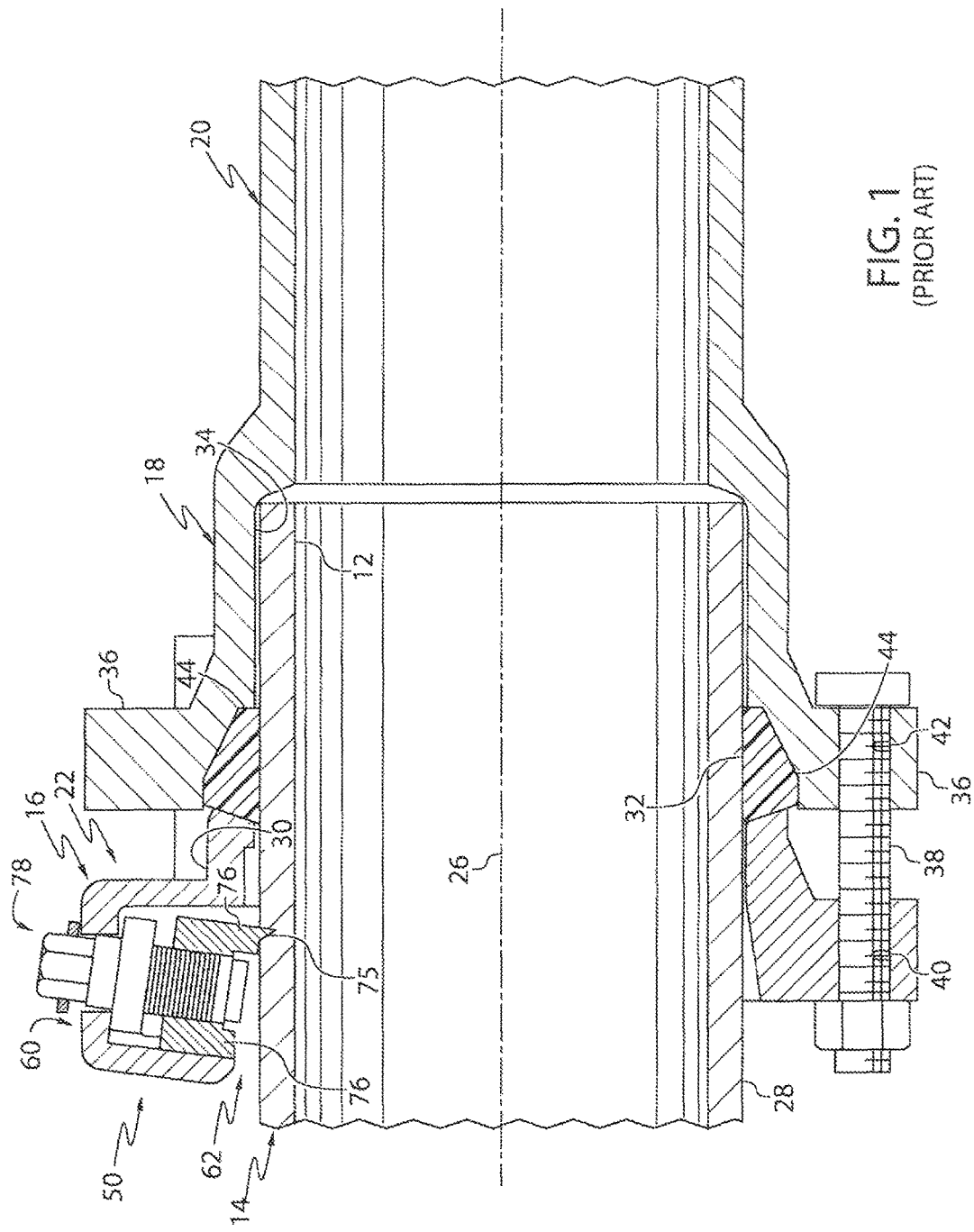
FIG. 1 is a cross-sectional view of a pair of pipes coupled together by a conventional pipe joint restraint.
Figure 2:
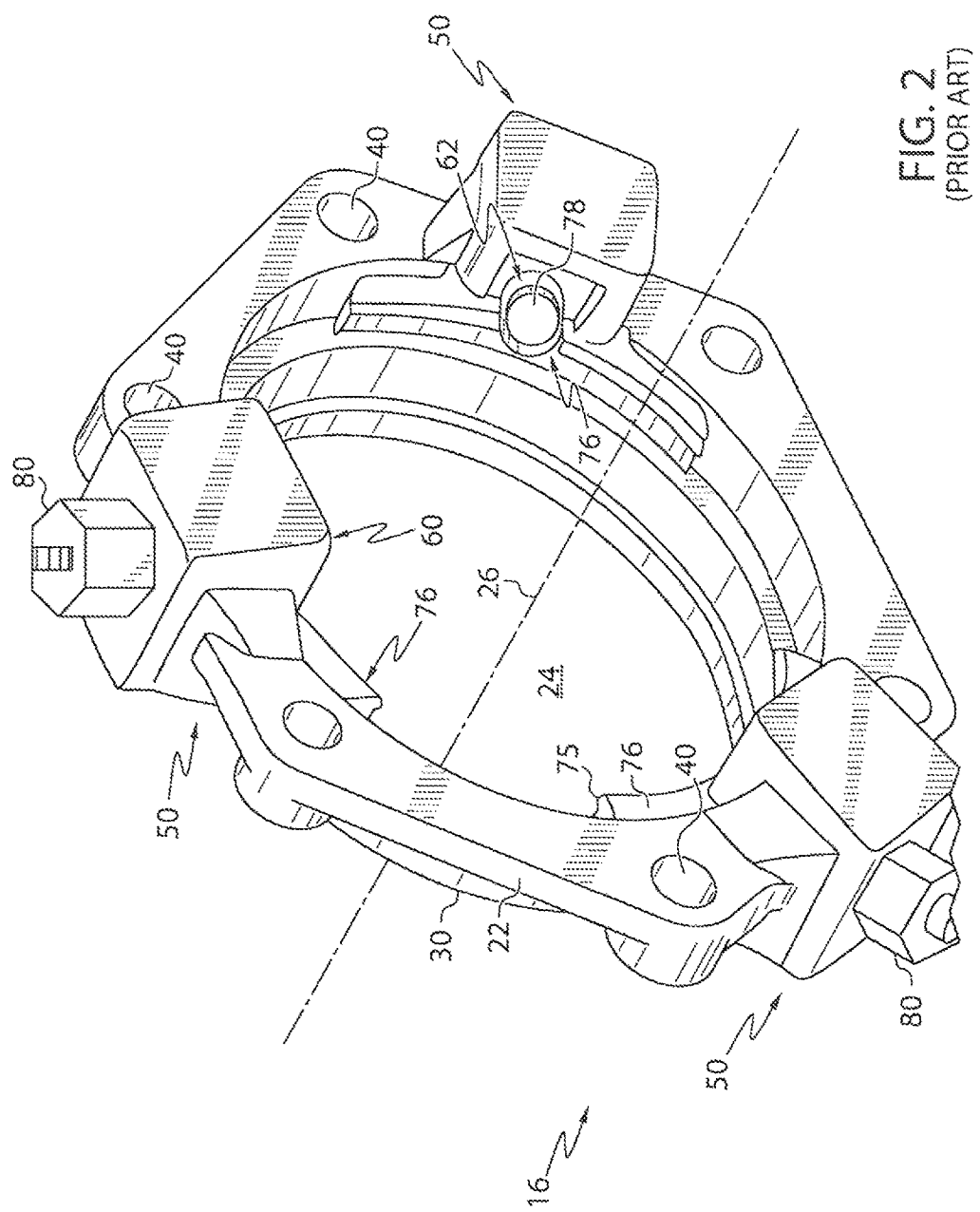
FIG. 2 is a perspective view of the pipe joint restraint of FIG. 1.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain features or elements may be exaggerated for clarity, and broken lines, if present, may illustrate optional features or operations unless specified otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features/elements, these features/elements should not be limited by these terms. These terms are only used to distinguish one feature/element from another feature/element. Thus, a first feature/element discussed below could be termed a second feature/element, and similarly, a second feature/element discussed below could be termed a first feature/element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Figure 3:
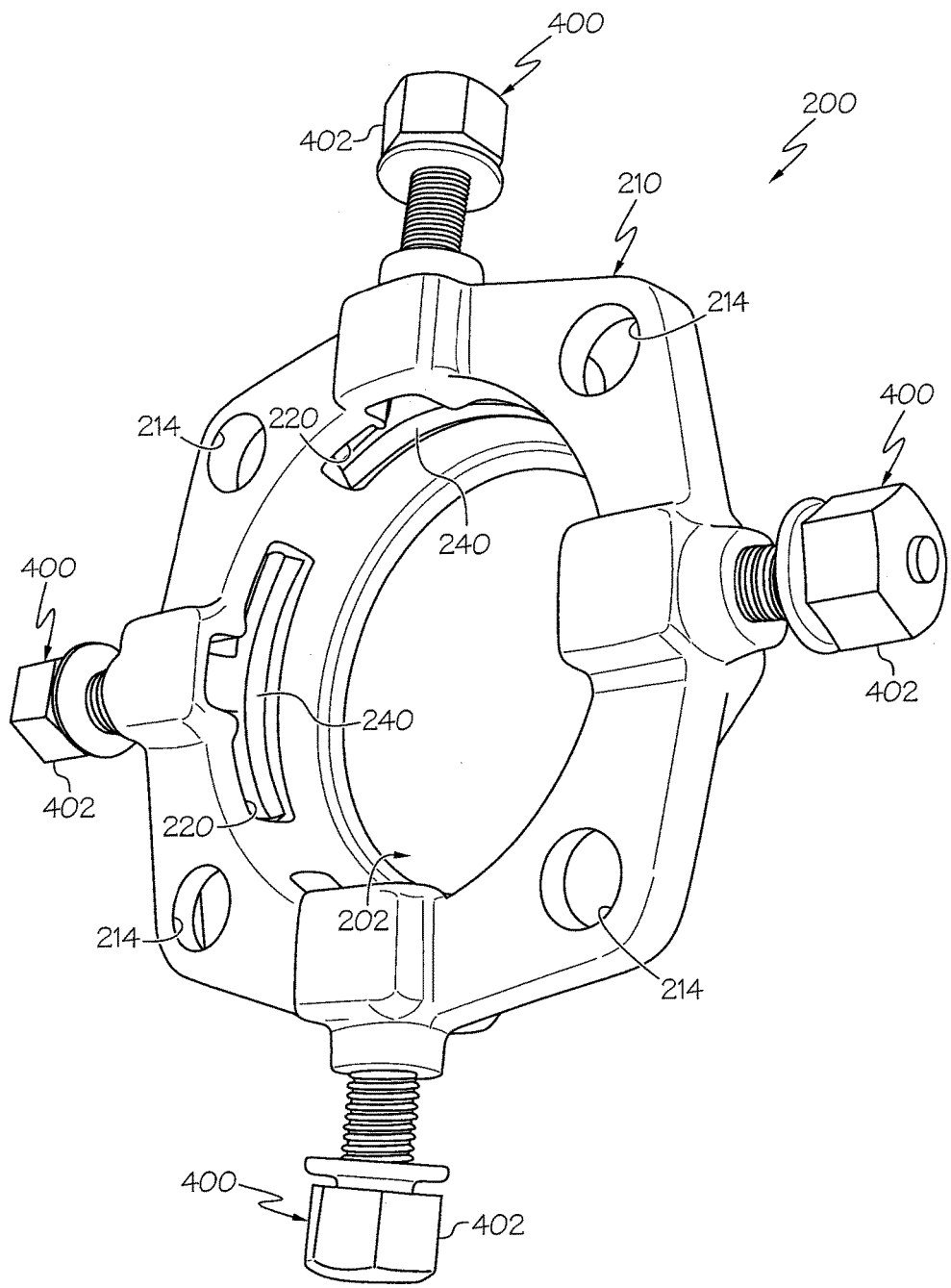
FIG. 3 is a rear perspective view of a pipe joint restraint, according to some embodiments of the present invention.
Figure 4:
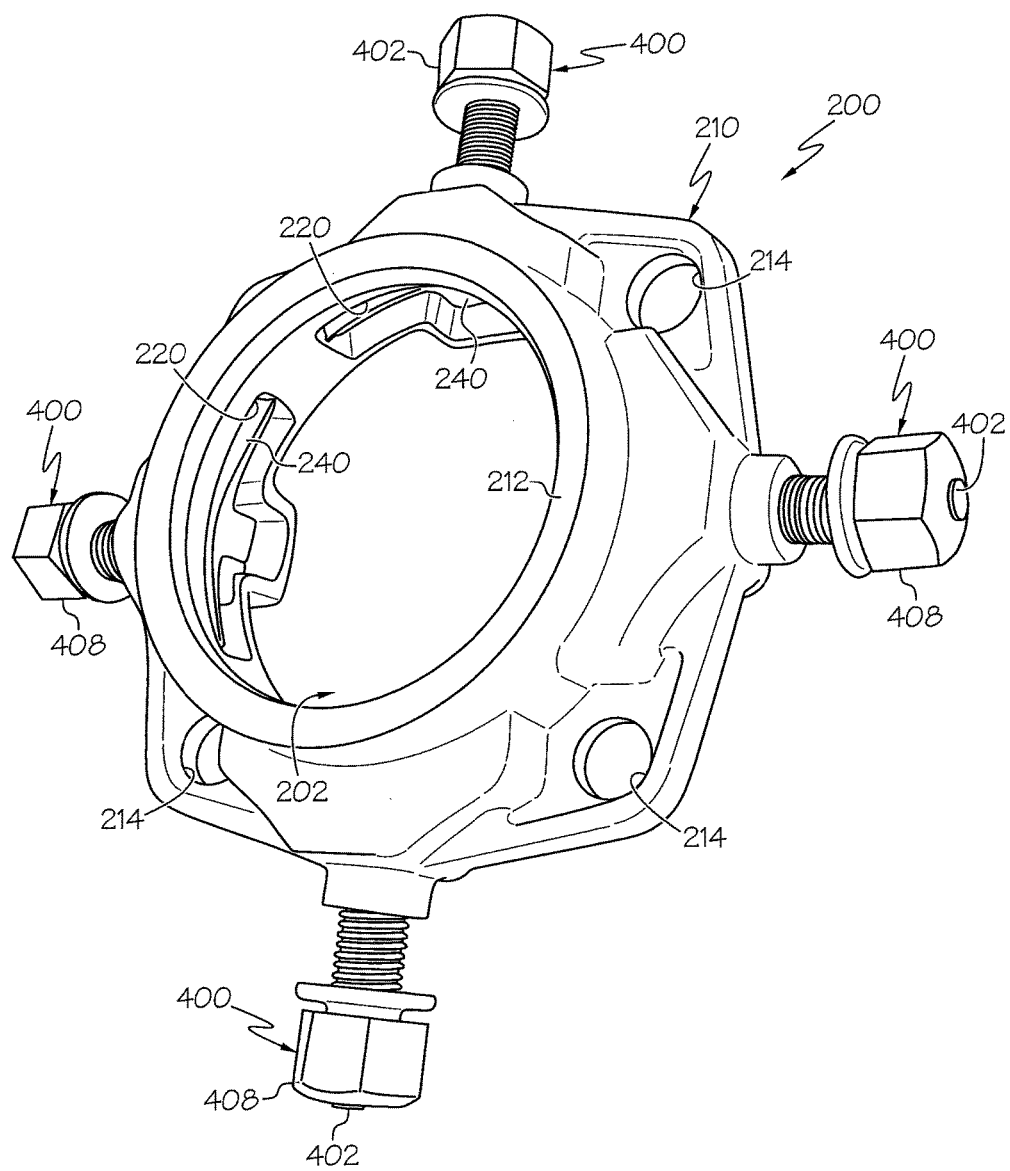
FIG. 4 is a front perspective view of the pipe joint restraint of FIG. 3.

Referring initially to FIGS. 3 and 4, a pipe joint restraint 200, according to some embodiments of the present invention, is illustrated. The pipe joint restraint 200 includes an annular retainer gland 210 that defines a pipe-receiving space 202 therethrough. The annular retainer gland 210 is configured to be disposed on the outer surface of a first pipe (e.g., pipe 14 of FIG. 1) and includes a front projecting rim 212 which butts up against an annular sealing member (e.g., gasket 32 of FIG. 1) received on the outer surface of the pipe end. The end of the second pipe is flared (e.g., 34, FIG. 1) to telescopically receive the first pipe end therein. The flange (e.g., 36, FIG. 1) of the second pipe end is secured to the annular retainer gland 210 with bolts (e.g., 38, FIG. 1) extending through apertures 214, as described above with respect to the apertures 40 illustrated in FIG. 1. The gasket is in a recess that is coaxial with the flange and is sized to receive a portion of the retainer gland projecting rim 212 so as to push the gasket into a water-tight sealing relationship with the surface of the first pipe and pipe recess as the bolts are tightened down, as described above with respect to FIG. 1.

Figure 13:
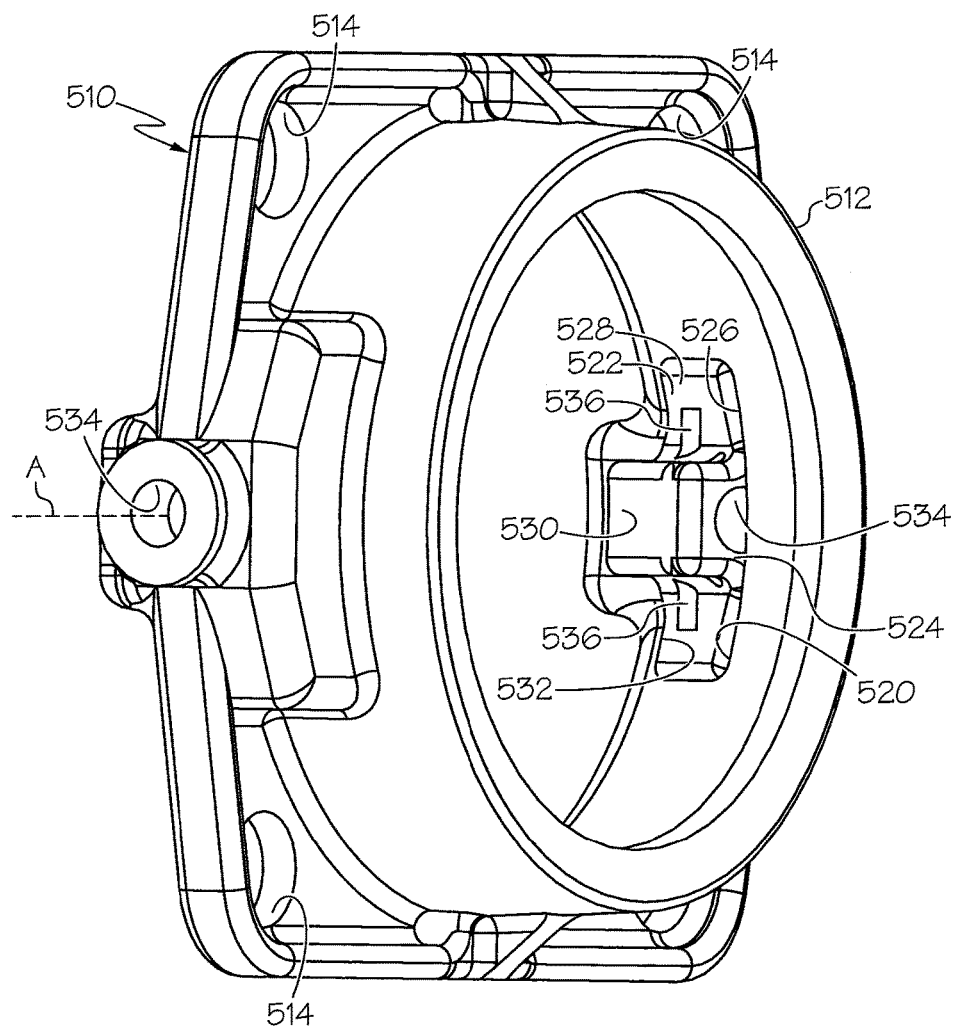
Figure 14A:
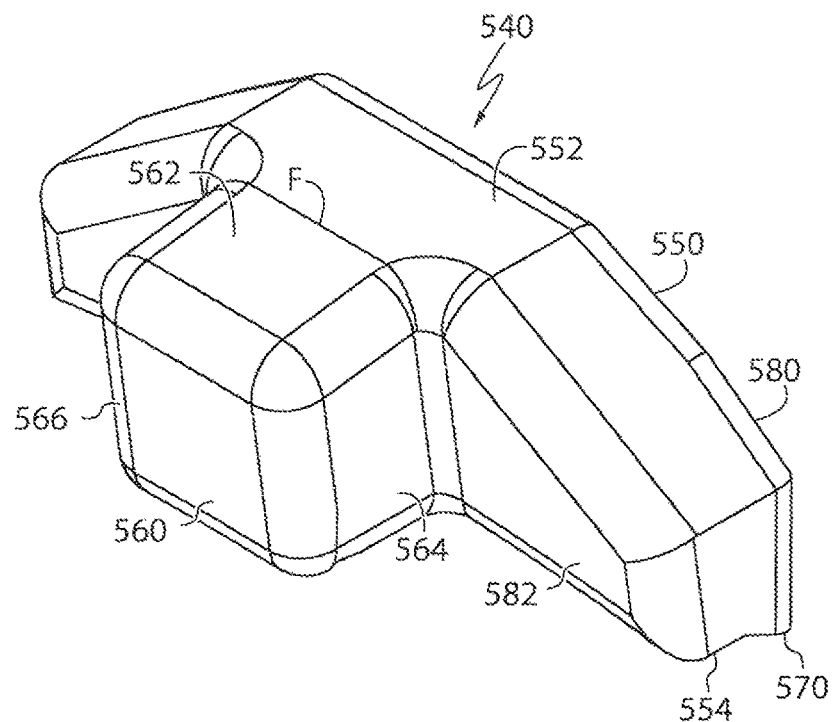
FIG. 14A is a perspective view of a pipe gripping element that can be utilized in the pipe joint restraint of FIGS. 12 and 13, according to some embodiments of the present invention.
Figure 14B:
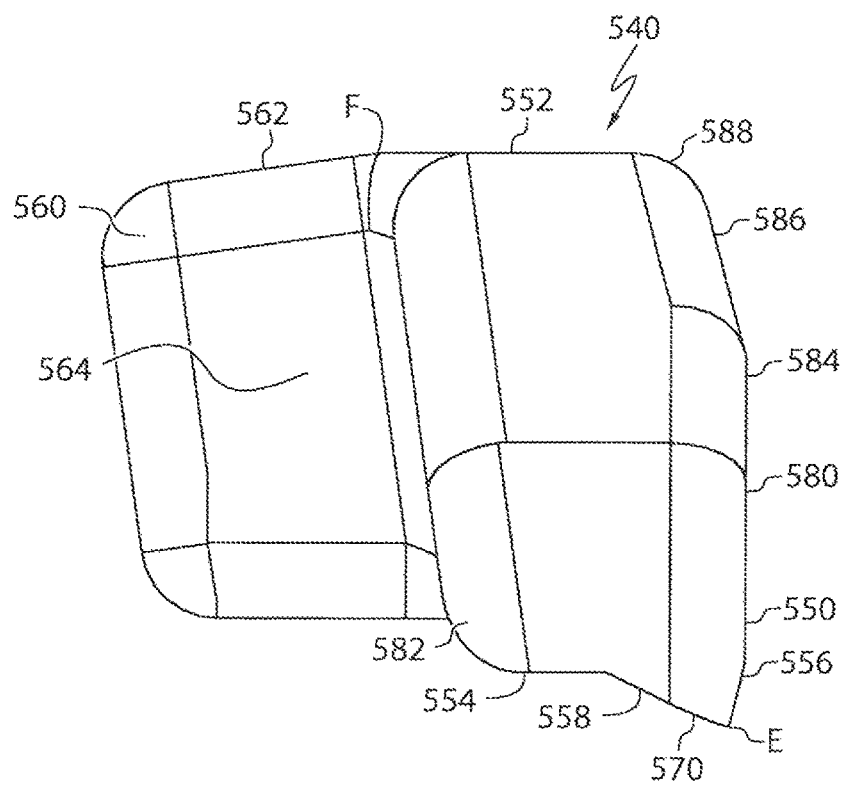
FIG. 14B is a side view of the pipe gripping element of FIG. 14A.
Figure 14C:
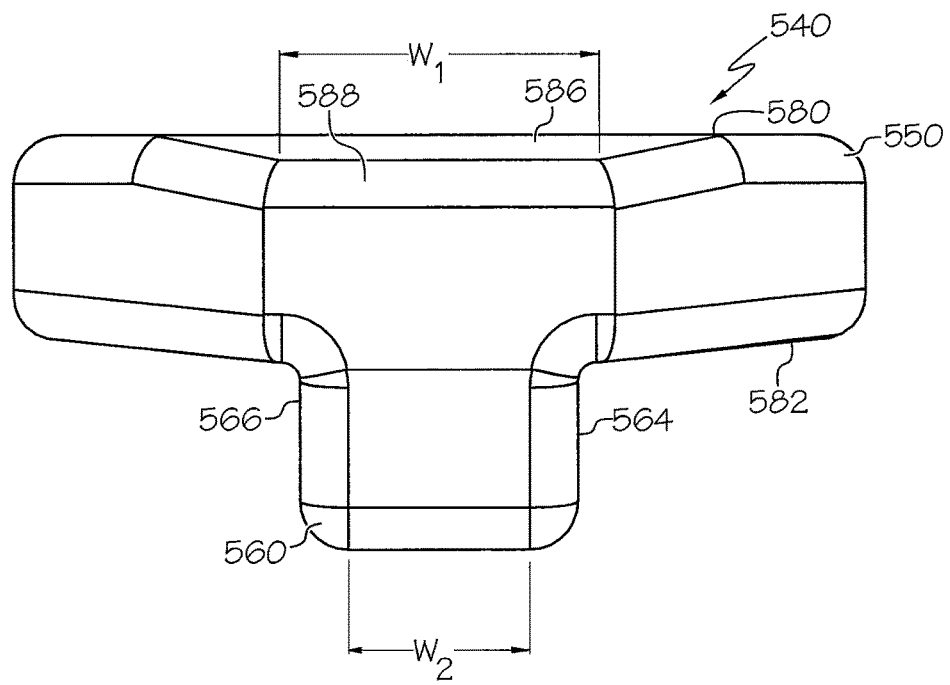
FIG. 14C is a top plan view of the pipe gripping element of FIG. 14A.
Figure 14D:
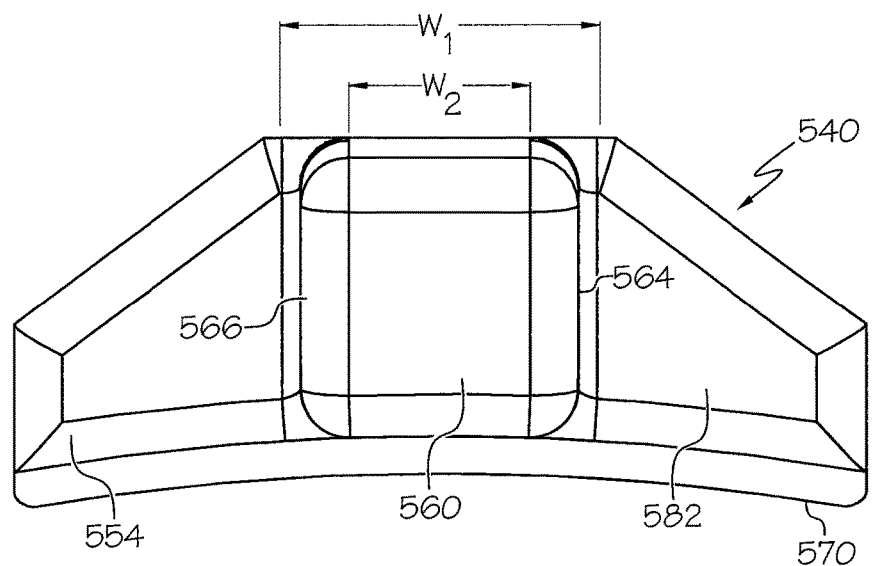
FIG. 14D is a rear elevation view of the pipe gripping element of FIG. 14A.

The illustrated annular retainer gland 210 includes a plurality of T-shaped pockets 220 in circumferential spaced-apart relationship, wherein each pocket 220 is configured to receive a respective T-shaped pipe gripping element 240 which contains at least one tooth that creates a thrust resisting groove in a pipe surface. The illustrated annular retainer gland 210 includes four (4) T-shaped pockets 220. However, various numbers of pockets 220 can be utilized, such as two (2), three (3), five (5), or more. For example, FIGS. 13 and 14 illustrate an annular retainer gland 510 having two (2) T-shaped pockets configured to receive respective gripping elements therein.

Figure 5:
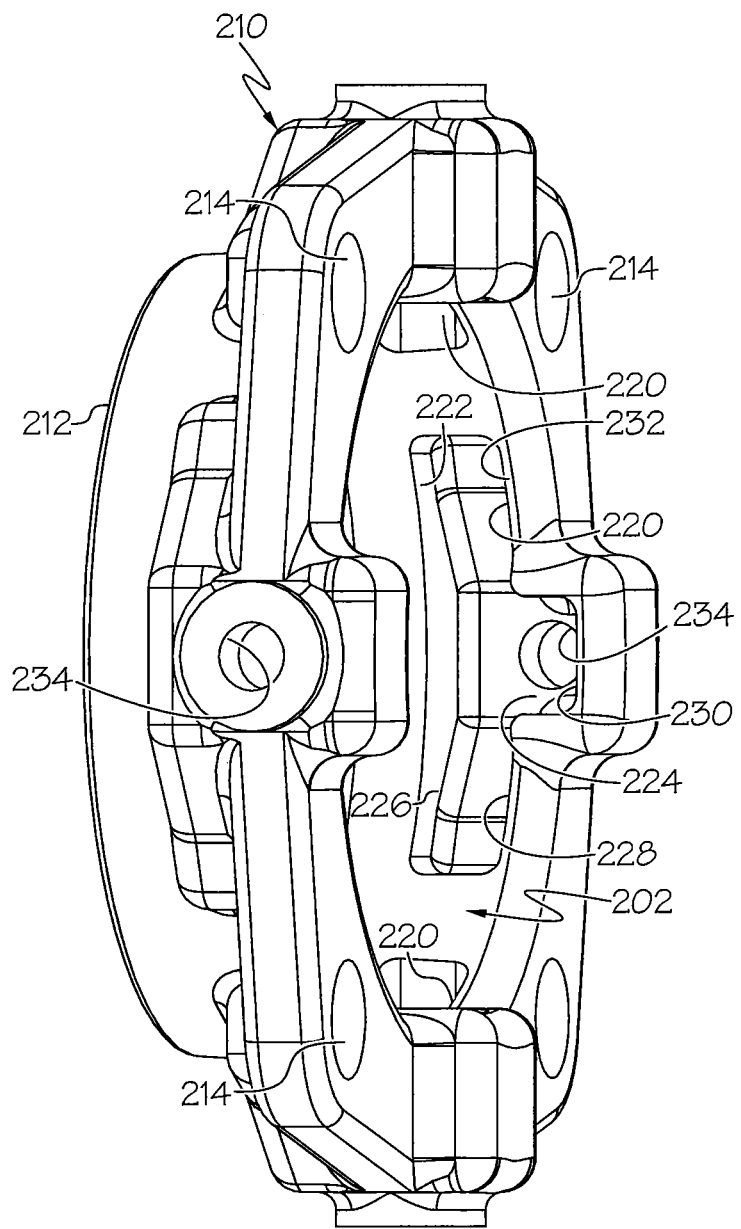
FIGS. 5 and 6 are perspective views of the pipe joint restraint of FIGS. 3 and 4, with the gripping elements and adjustment members removed for clarity.
Figure 6:
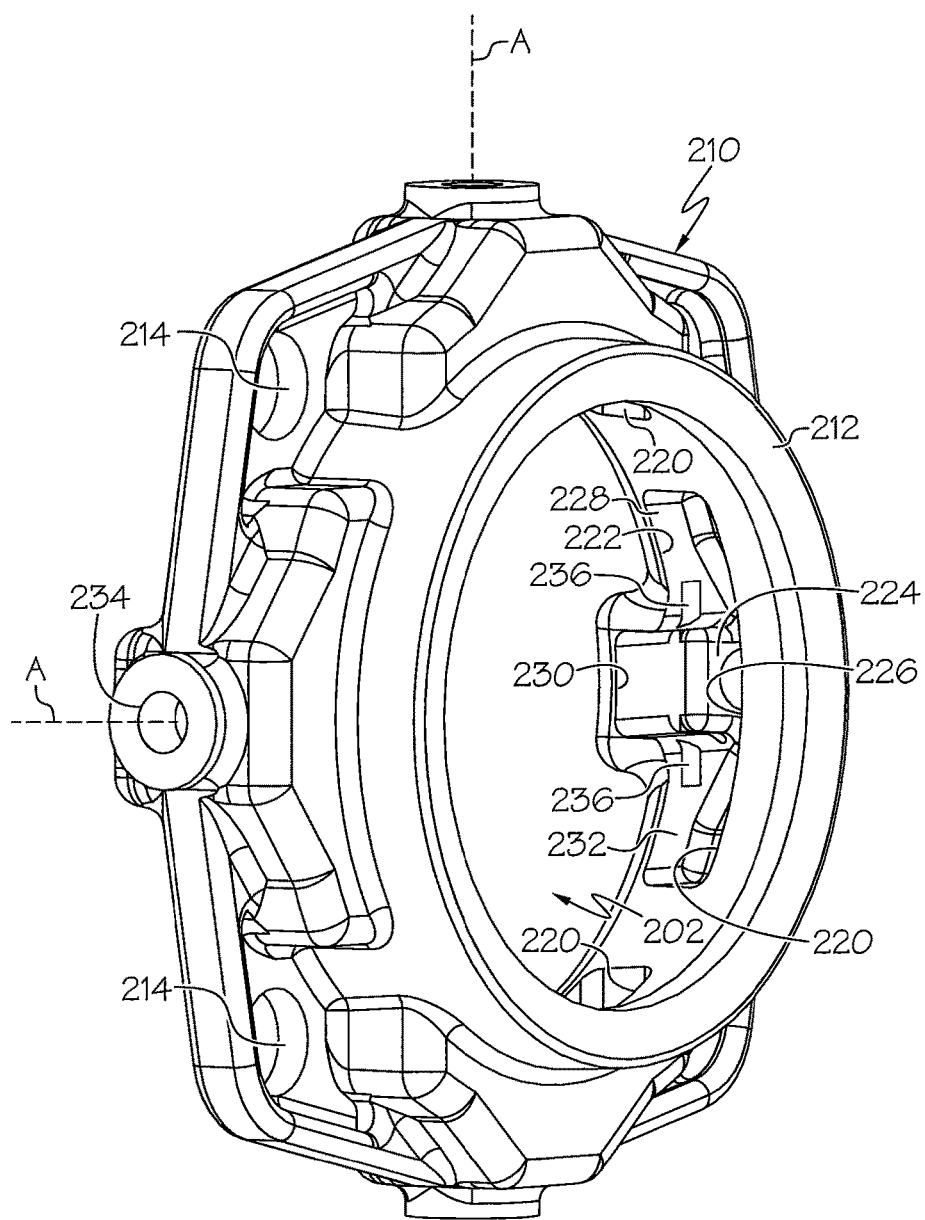
Figure 7:
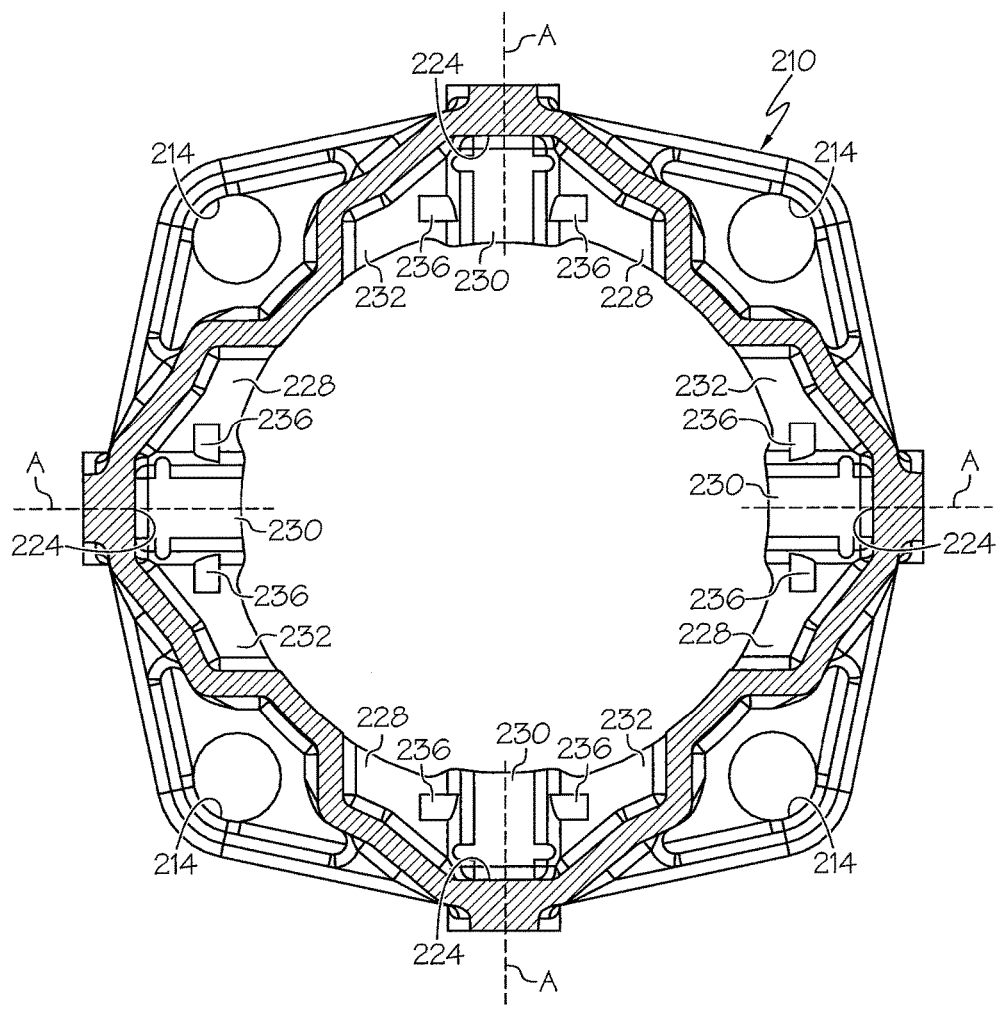
FIG. 7 is a cross sectional view of the pipe joint restraint of FIGS. 3 and 4.
Figure 8A:
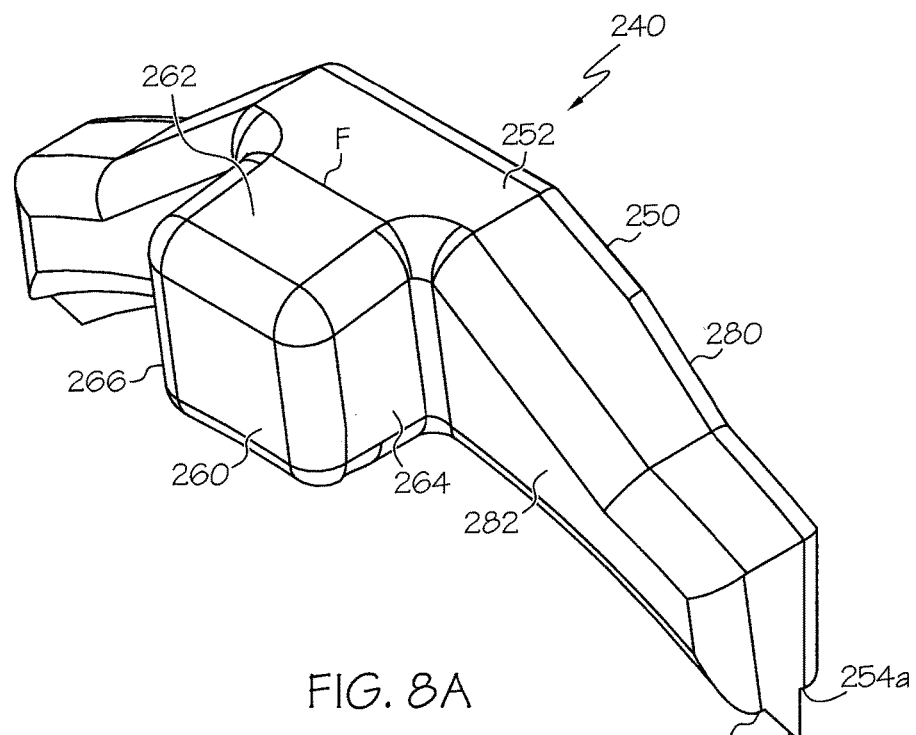
FIG. 8A is a perspective view of a pipe gripping element utilized in the pipe joint restraint of FIGS. 3 and 4, according to some embodiments of the present invention.
Figure 8B:
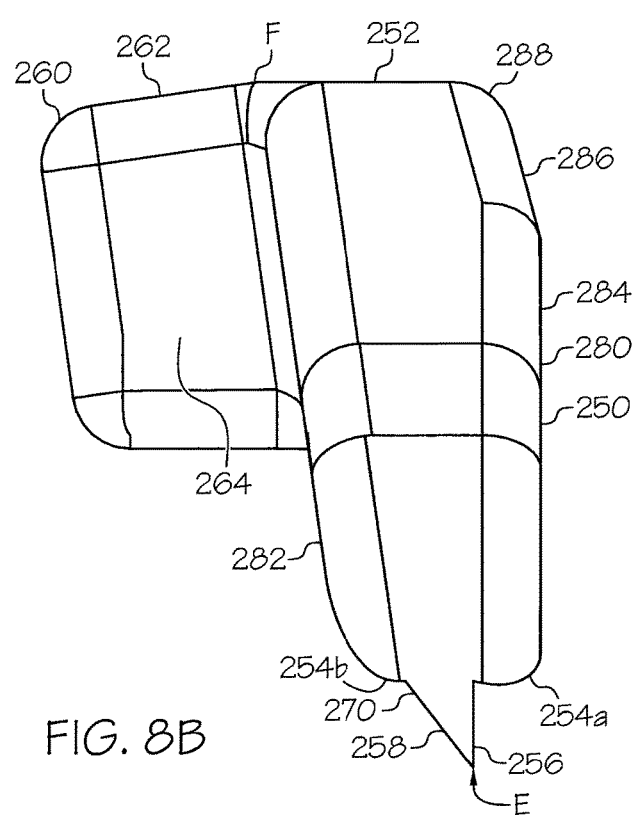
FIG. 8B is a side view of the pipe gripping element of FIG. 8A.
Figure 8C:
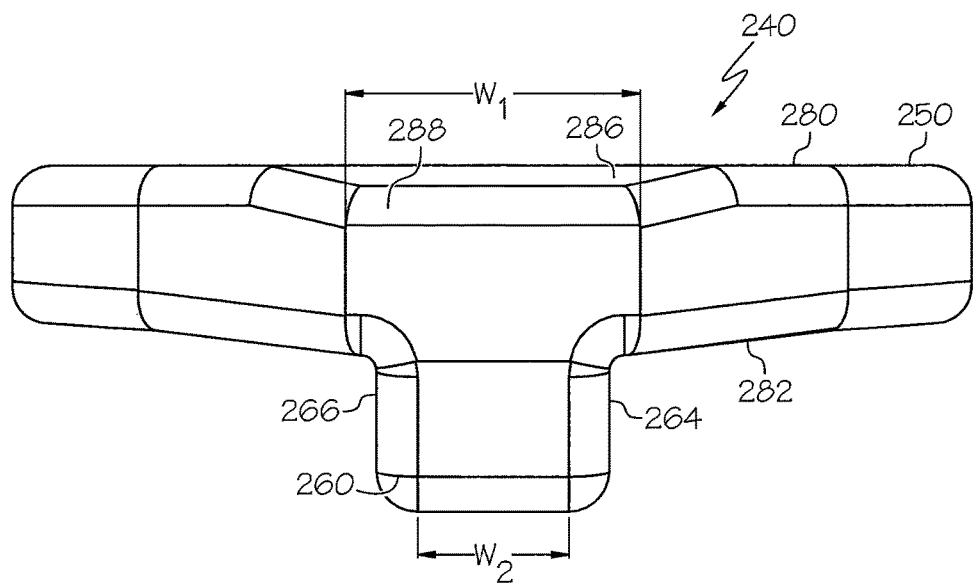
FIG. 8C is a top plan view of the pipe gripping element of FIG. 8A.
Figure 8D:
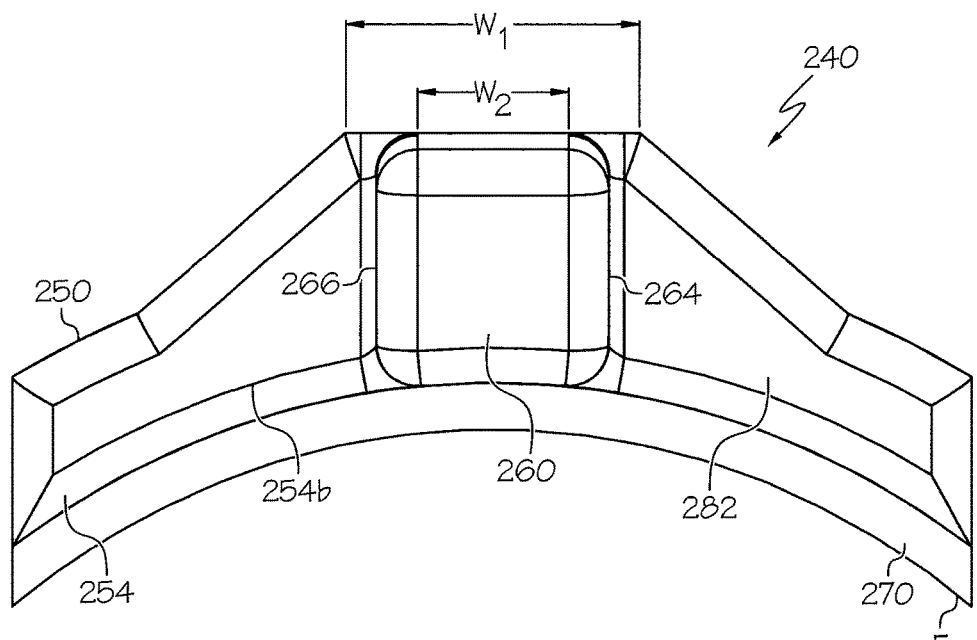
FIG. 8D is a rear elevation view of the pipe gripping element of FIG. 8A.

As illustrated in FIGS. 5-7, each pocket 220 has an opening 222 confronting the pipe-receiving space 212. The pockets 220 are configured to receive a respective plurality of T-shaped pipe gripping elements 240, as illustrated in FIGS. 3 and 4. Each pocket 220 includes a top wall 224, a front wall 226, and first, second and third rear walls 228, 230, 232. The second rear wall 230 is centrally located such that the first and third rear walls 228, 232 are on respective opposite sides of the second rear wall 230, as illustrated. The top wall 224 contains a threaded through hole 234 located with its axis A centered at the junction of the base member 260 and cross member 250 of a gripping element 240, as will be described below.

In the illustrated embodiment, the first and third rear walls 228, 232 each include a respective groove or recessed portion 236 therein. These recessed portions 236 are configured to receive respective wedge members 300 therein, as will be described below.

Referring to FIGS. 8A-8D, a pipe gripping element 240 utilized in the pipe joint restraint 200 of FIGS. 3-7 will be described. The illustrated pipe gripping element 240 includes an elongated cross member 250 and a base member 260 extending from the cross member 250. The cross member 250 includes a flat or planar upper portion 252 and an opposite lower arcuate portion 254. The base member 260 includes a flat or planar upper portion 262 that is angled or slanted relative to the cross member upper portion 252 to define a fulcrum F. To create the fulcrum F, the base member upper portion 262 is slanted relative to the cross member upper portion 252 between about five degrees and about fifteen degrees (5°-15°), however other angles are possible. In the illustrated embodiment, the base member upper portion 262 is slanted relative to the cross member upper portion 252 by about eight degrees (8°). Also, in the illustrated embodiment, the base member 260 includes opposite side portions 264, 266.

In the illustrated embodiment, the cross member upper portion 252 and the base member upper portion 262 are each substantially flat, although non-flat configurations are possible as long as they are angled relative to each other to create a fulcrum F. In the illustrated embodiment, the cross member upper portion 252 has a width $W_1$ that is greater than a width $W_2$ of the base member upper portion 262.

An elongated, arcuate tooth 270 extends outwardly from the lower arcuate portion 254 of the cross member 250. The tooth 270 includes a front wall 256 and a rear wall 258 that converge to form a pipe gripping edge E. The tooth gripping edge E is configured to generally conform to an arcuate shape of an outer surface of a pipe. In the illustrated embodiment of FIGS. 8A-8D, the tooth 270 is positioned between opposite front and rear edges 254a, 254b of the lower arcuate portion 254. However, in other embodiments, the elongated, arcuate tooth 270 may extend outwardly from the lower arcuate portion 254 at the front edge, thereof as illustrated in FIGS. 14A-14D.

Still referring to FIGS. 8A-8D, the cross member 250 includes opposite front and rear portions 280, 282, and the base member 260 extends outwardly from the cross member rear portion 282. In the illustrated embodiment, the cross member front portion 280 includes first and second wall portions 284, 286 that are slanted relative to each other. The second wall portion 286 has a common edge 288 with the cross member upper portion 252. The illustrated first and second wall portions 284, 286 have a flat or planar configuration, but other configurations may be possible.

Figure 9:
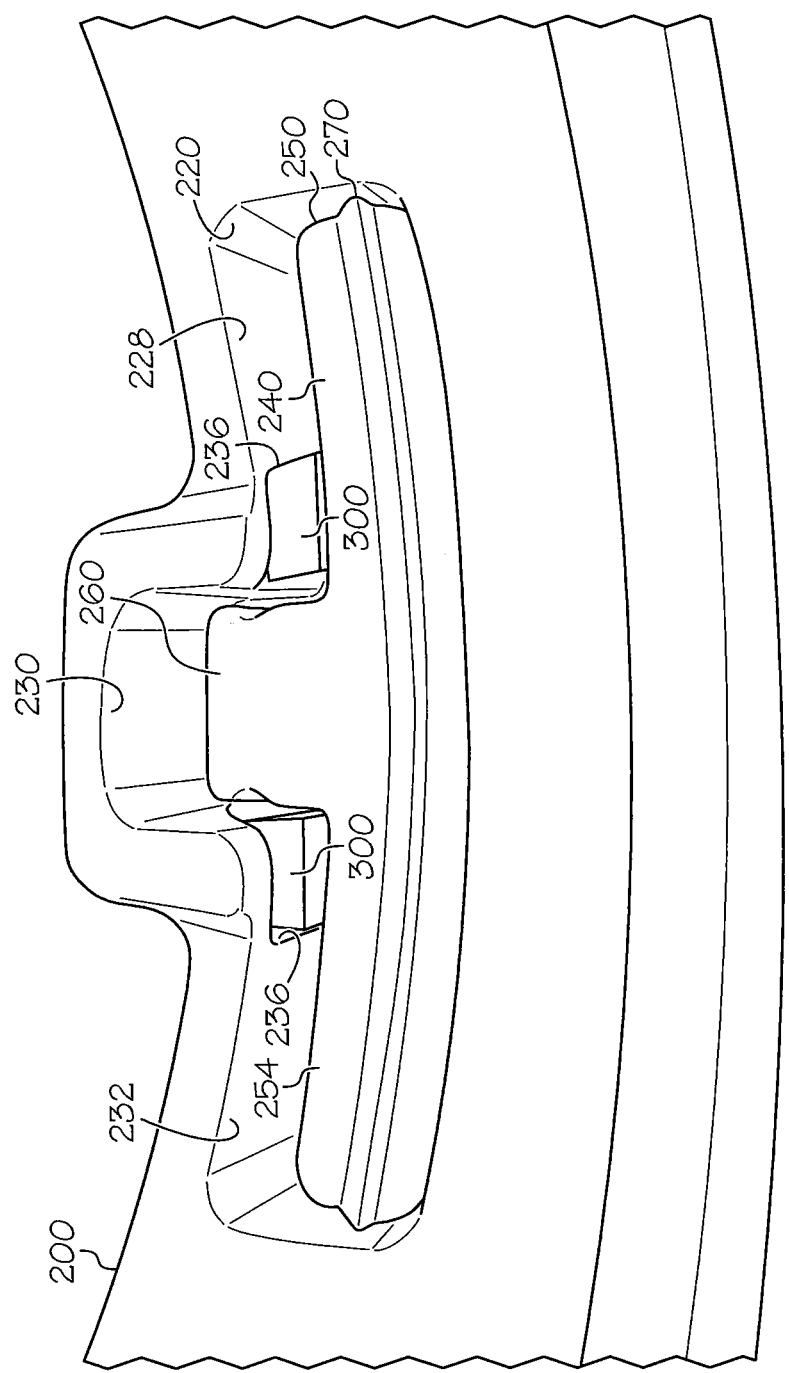
FIG. 9 is an enlarged partial view of the pipe joint restraint of FIGS. 3 and 4 illustrating a T-shaped gripping element within a T-shaped pocket. Wedge members are also illustrated between the gripping element cross member and the first and third rear walls of the pocket.

Referring now to FIG. 9, an enlarged view of a pocket 220 and pipe gripping element 240 positioned therein of the pipe joint restraint 200 of FIGS. 3-7 is illustrated. A wedge member 300 is positioned between the cross member and the first rear wall and between the cross member and the third rear wall. Each wedge member 300 may be adhesively secured within a respective recessed portion 236 in the first and third rear walls.

Figure 10C:
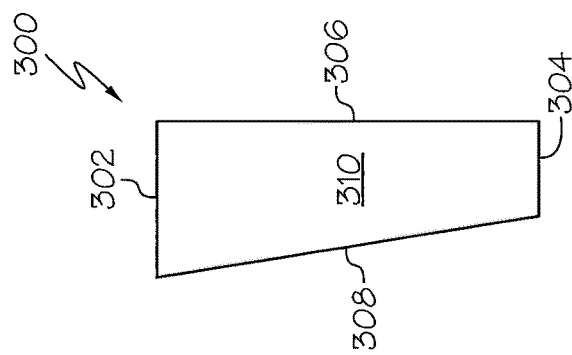
FIG. 10C is a side view of the wedge member of FIG. 10A.
Figure 10B:
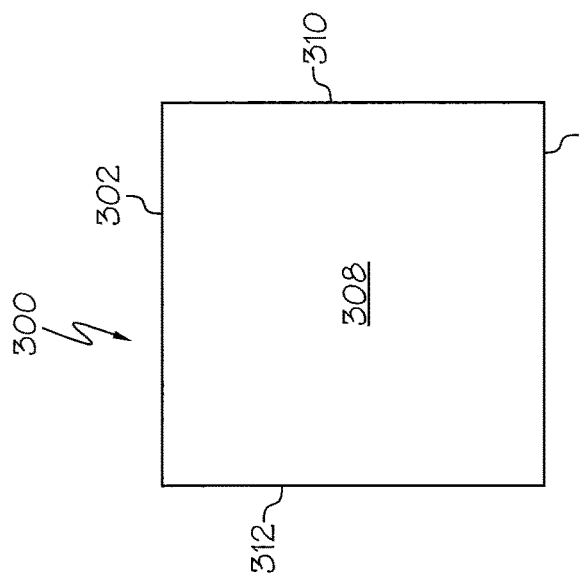
FIG. 10B is a front plan view of the wedge member of FIG. 10A.
Figure 10A:
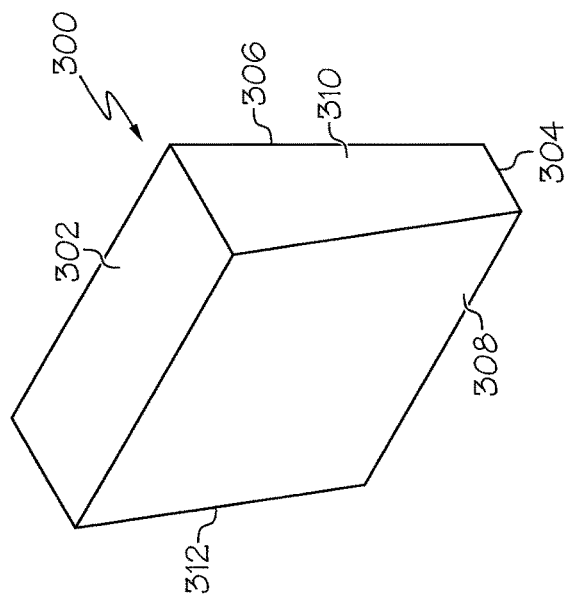
FIG. 10A is a perspective view of a wedge member, according to some embodiments of the present invention.

Referring to FIGS. 10A-10C, an exemplary wedge member 300 is illustrated. The illustrated wedge member 300 has a generally trapezoid cross-sectional configuration, with substantially parallel upper and lower portions 302, 304, angled front and rear portions 308, 306, and substantially parallel side portions 310, 312. However, wedge members utilizes in accordance with embodiments of the present invention may have various shapes and configurations. In some embodiments, the wedge members are formed of a resilient material, such as rubber, etc. In use, a respective gripping element 240 slides against the wedge members 300 via an adjustment member 400 (FIGS. 3-4), and moves into position against a pipe surface in a forward or cocked position, ready to rotate when a separating force is applied.

Figure 11:
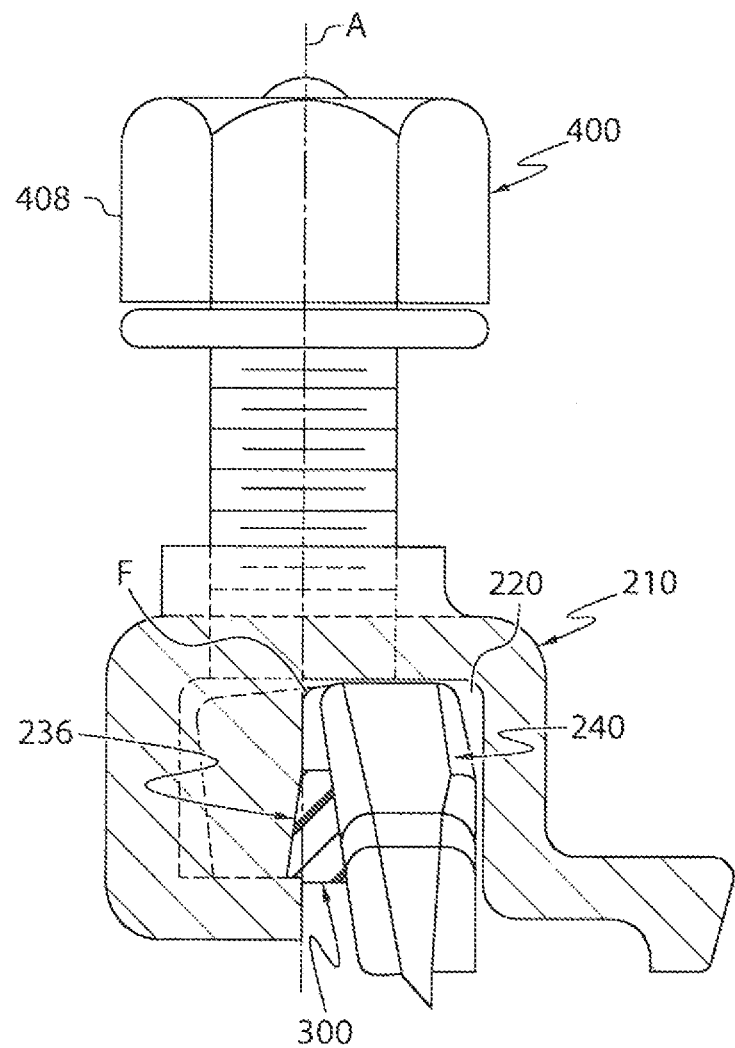
FIG. 11 is a cross-sectional view of a T-shaped gripping element within a T-shaped pocket of the pipe joint restraint of FIGS. 3 and 4 that illustrates the flat distal end of the threaded adjustment member contacting the upper portion of the gripping element at a fulcrum.

FIG. 11 is a cross-sectional view of a T-shaped gripping element 240 within a T-shaped pocket 220 of the pipe joint restraint of FIGS. 3 and 4 that illustrates the flat distal end of the threaded adjustment member 400 contacting the upper portion of the gripping element at the fulcrum F. The position of a wedge member 300 is also illustrated in FIG. 11.

Referring back to FIGS. 3-7, a plurality of threaded adjustment members 400 are each threadingly engaged with a respective pocket 220 via a threaded opening 234 in the pocket top wall 224. Each adjustment member 400 has opposite proximal and distal ends 402, 404 (FIGS. 15A, 15B). The distal end 404 of each adjustment member 400 has a flat configuration (i.e., not rounded) and is operably associated with a respective gripping element 240 at the fulcrum F thereof and is adapted to move the gripping element 240 relative to the pocket 220. In some embodiments, each threaded adjustment member 400 includes a deformable thread (410, FIG. 15a) at the distal end 404 thereof that is configured to deform during use of the pipe joint restraint 200 such that each threaded adjustment member 400 is non-removable from a respective pocket top wall 224.

As illustrated in FIGS. 3-4 and FIGS. 15A-15B, each adjustment member 400 includes a flange 406 that is configured to limit a distance that the adjustment member 400 can be threaded into a respective pocket 220. Each adjustment member also includes a torque off nut 408 that engages the proximal end 402 thereof. The torque off nut 408 is configured to separate from the adjustment member when a threshold amount of torque is applied to the adjustment member 400 as it is being threaded into a pocket 220.

Figure 12:
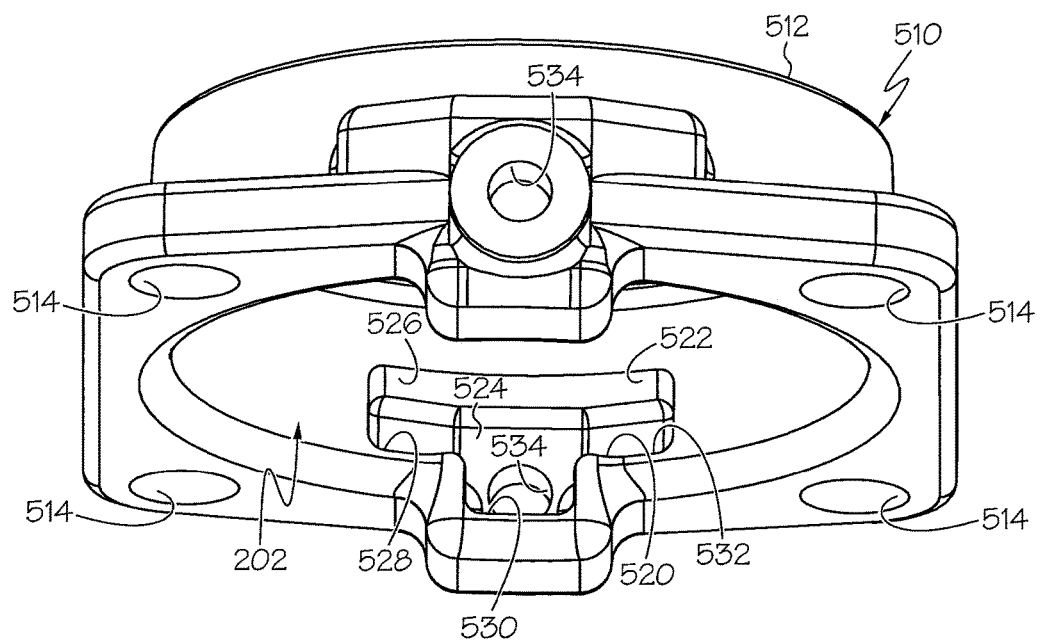
FIGS. 12 and 13 are perspective views of a pipe joint restraint, according to other embodiments of the present invention, and with the gripping elements and adjustment members removed for clarity.

Referring now to FIGS. 12 and 13, an annular retainer gland 510 having two (2) T-shaped pockets 520 configured to receive respective gripping elements therein is illustrated. The annular retainer gland 510 is configured to be disposed on the outer surface of a first pipe (e.g., pipe 14 of FIG. 1) and includes a front projecting rim 512 which butts up against an annular sealing member (e.g., gasket 32 of FIG. 1) received on the outer surface of the pipe end. The end of the second pipe is flared (e.g., 34, FIG. 1) to telescopically receive the first pipe end therein. The flange (e.g., 36, FIG. 1) of the second pipe end is secured to the annular retainer gland 510 with bolts (e.g., 38, FIG. 1) extending through apertures 514, as described above with respect to the apertures 40 illustrated in FIG. 1. The gasket is in a recess that is coaxial with the flange and is sized to receive a portion of the retainer gland projecting rim 512 so as to push the gasket into a water-tight sealing relationship with the surface of the first pipe and pipe recess as the bolts are tightened down, as described above with respect to FIG. 1. Each pocket 520 has an opening 522 confronting the pipe-receiving space 202. The pockets 520 are configured to receive a respective plurality of T-shaped pipe gripping elements 540 (FIGS. 14A-14D). Each pocket 520 includes a top wall 524, a front wall 526, and first, second and third rear walls 528, 530, 532. The second rear wall 530 is centrally located such that the first and third rear walls 528, 532 are on respective opposite sides of the second rear wall 530, as illustrated. The top wall 524 contains a threaded through hole 534 located with its axis A centered at the junction of the base member 560 and cross member 550 of the gripping element 540. The first and third rear walls 528, 532 each include a respective groove or recessed portion 536 therein. These recessed portions 536 are configured to receive respective wedge members 300 therein, as described above.

Referring to FIGS. 14A-14D, the pipe gripping element 540 utilized in the annular retainer gland 510 of FIGS. 12 and 13 will be described. The illustrated pipe gripping element 540 includes an elongated cross member 550 and a base member 560 extending from the cross member 550. The cross member 550 includes a flat or planar upper portion 552 and an opposite lower arcuate portion 554. The base member 560 includes a flat or planar upper portion 562 that is angled or slanted relative to the cross member upper portion 552 to define a fulcrum F. To create the fulcrum F, the base member upper portion 562 is slanted relative to the cross member upper portion 552 between about five degrees and about fifteen degrees (5°-15°), however other angles are possible.

In the illustrated embodiment, the cross member upper portion 552 and the base member upper portion 562 are each substantially flat, although non-flat configurations are possible as long as they are angled relative to each other to create a fulcrum F. In the illustrated embodiment, the cross member upper portion 552 has a width $W_1$ that is greater than a width $W_2$ of the base member upper portion 562.

An elongated, arcuate tooth 570 extends outwardly from the lower arcuate portion 554 of the cross member 550. The tooth 570 includes a front wall 556 and a rear wall 558 that converge to form a pipe gripping edge E. The tooth gripping edge E is configured to generally conform to an arcuate shape of an outer surface of a pipe.

The cross member 550 includes opposite front and rear portions 580, 582, and the base member 560 extends outwardly from the cross member rear portion 582. In the illustrated embodiment, the cross member front portion 580 includes first and second wall portions 584, 586 that are slanted relative to each other. The second wall portion 586 has a common edge 588 with the cross member upper portion 552. The illustrated first and second wall portions 584, 586 have a flat or planar configuration, but other configurations may be possible. Also, in the illustrated embodiment, the base member 560 includes opposite side portions 564, 566.

Figure 17A:
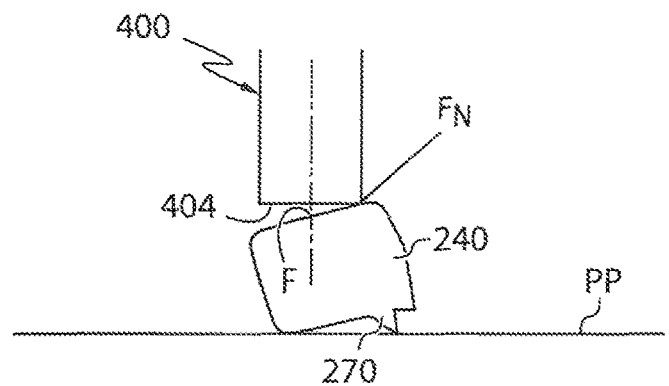
FIGS. 17A-17C illustrate an insertion sequence of the pipe gripping element of FIGS. 8A-8D into a plastic pipe, such as a PVC pipe, according to some embodiments of the present invention.
Figure 17B:
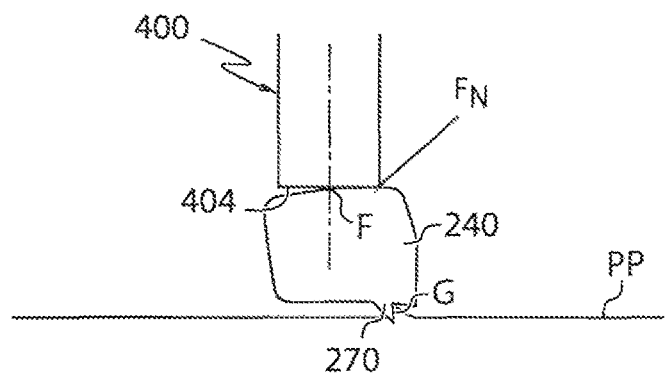
Figure 17C:
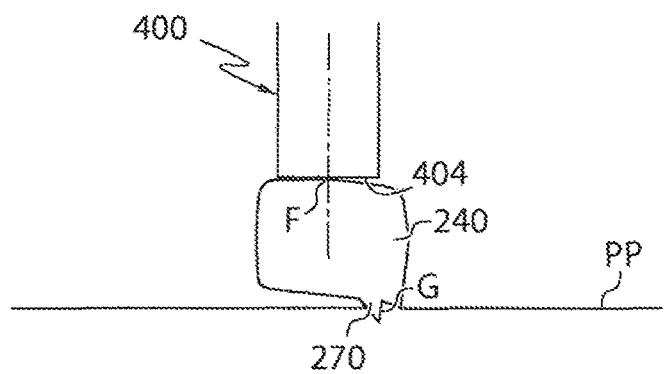

FIGS. 17A-17C illustrate an insertion sequence of the pipe gripping element 240 of FIGS. 8A-8D into a plastic pipe PP, such as a PVC pipe, according to some embodiments of the present invention. In FIG. 17A, the distal end 404 of the adjustment member 400 is being threaded into the pocket (i.e., pocket 220, FIGS. 5-6) containing the gripping element 240. A peripheral edge of the distal end 404 of the adjustment member makes initial contact with the gripping element cross member, as illustrated in FIG. 17A, and this creates a first center of rotation of the gripping element 240. The gripping element rotates and the flat portion of the distal end 404 is positioned at the fulcrum F of the gripping element 240, as illustrated in FIG. 17B. The fulcrum creates a second center of rotation of the gripping element 240. As illustrated in FIG. 17B, the tooth 270 has become embedded in the pipe PP. In FIG. 17C, the gripping element 240 has rotated further (i.e., toggled) into the final position. In FIG. 17A, the downward force on the gripping element 240 is very great at first to get the initial bite of the tooth 270 into the pipe, and then decreases to a normal amount as the center fulcrum F on the gripping element 240 takes over. The gripping element 240 continues to rotate until the designed insertion depth is reached and the gripping element 240 contacts the first and third rear walls 228, 232 of a pocket 220.

The gripping element 240 is configured to contact the front wall 226 of a pocket 220 in the retaining gland 210, initially. The gripping element 240 is tapered on its rear surface 282 at the desired angle of rotation such that at the completion of rotation about the fulcrum F the rear wall 282 of the cross member 250 of each gripping element 240 bears against the rear walls 228, 232 on each side of the base of the pocket 220. The extension of the fulcrum F onto the elongated cross member 250 of the gripping element 240 contacts the junction of the sidewalls of the base and the rear wall of the cross member 250, guiding the rotation of the gripping element 240 into its final position (FIG. 17C) and insuring the center of rotation remains at the contact point of the flat distal end 404 of the adjustment member 400 and the fulcrum F. As such, subsequent thrust is carried by the rear wall 282 of the cross member 250 of the gripping element 240.

Figure 18A:
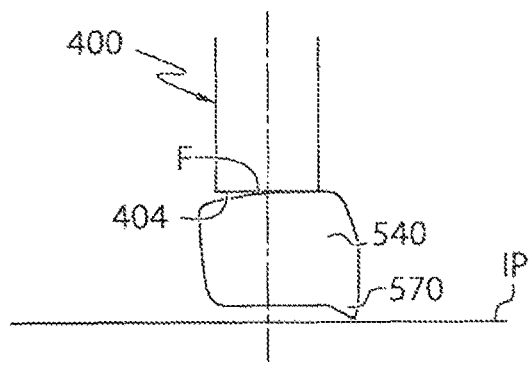
FIGS. 18A-18C illustrate an insertion sequence of the pipe gripping element of FIGS. 14A-14D into an iron pipe, such as a ductile iron pipe, according to some embodiments of the present invention.
Figure 18B:
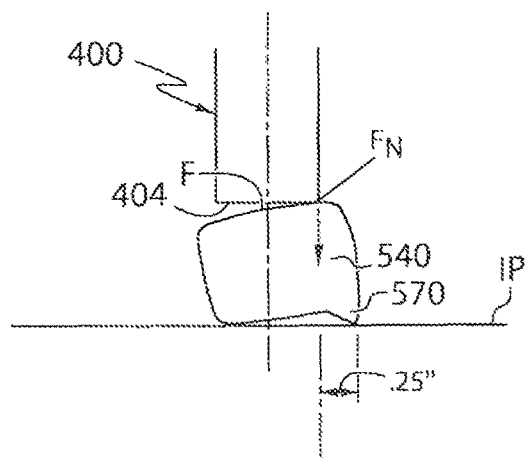
Figure 18C:
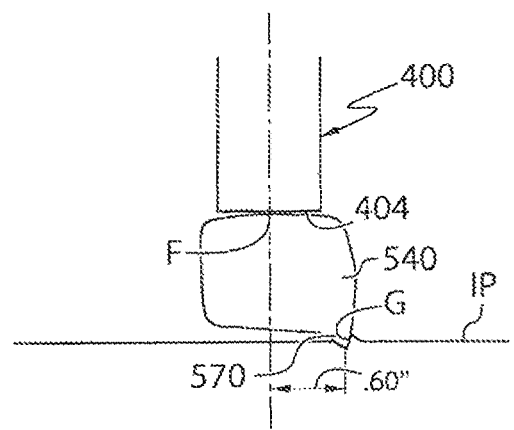

FIGS. 18A-18C illustrate an insertion sequence of the pipe gripping element 540 of FIGS. 14A-14D into an iron pipe IP, such as a ductile iron pipe, according to some embodiments of the present invention. In FIG. 18A, the distal end 404 of the adjustment member 400 is being threaded into the pocket (i.e., pocket 520, FIGS. 12-13) containing the gripping element 540. As the adjustment member continues to be threaded into the pocket, the distal end 404 is positioned at the fulcrum F of the gripping element 540, as illustrated in FIG. 18B and the tooth 570 has become embedded in the pipe IP. In FIG. 18C, the gripping element 540 has toggled into the final position.

The gripping element 540 is configured to contact the front wall 526 of a pocket 520 in gland 510 initially. The gripping element 540 is tapered on the rear wall 582 of the cross member 550 at the desired angle of rotation such that at the completion of rotation about the fulcrum F the rear wall 582 of the cross member 550 of each gripping element 540 bears against the rear walls 528, 532 on each side of the base of the pocket 520. The extension of the fulcrum F onto the elongated cross member 550 of the gripping element 540 contacts the junction of the sidewalls of the base and the rear wall of the cross member 550, guiding the rotation of the gripping element 540 into its final position (FIG. 18C) and insuring the center of rotation remains at the contact point of the flat distal end 404 of the adjustment member 400 and the fulcrum F. As such, subsequent thrust is carried by the rear wall 582 of the cross member 550 of the gripping element 540.

As illustrated in FIGS. 17A-17C and 18A-18C, the flat distal end 404 of the adjustment member 400 contacts the top of each gripping element 240, 540 and as motion of the adjustment member 400 continues into the pocket 220, 520, the gripping element 240, 540 rotates back until the rear corner of the base 260, 560 of the T-shaped gripping element 240, 540 contacts the surface of the pipe PP, IP. This rearward position of the gripping element 240, 540 moves the contact point from the center of the distal end 404 to the edge, creating a new fulcrum point $F_N$ near the front edge of the cross member 250, 550. The new fulcrum point $F_N$ is near the tooth 270, 570 and therefore the initial force multiplier of the toggle is increased dramatically. The result is an increase in the initial downward force causing the bite of the tooth 270, 570 to occur much sooner, overcoming the tendency for the tooth 270, 570 to slip on the pipe surface rather than bite in.

As separation forces increase, the gripping element 240, 540 rotates forward and the fulcrum F is engaged (FIGS. 17B, 18B). The toggle forces the tooth 270, 570 into the pipe surface. Rotation of the gripping element 240, 540 is complete when the tapered rear wall 282, 582 of the cross member 250, 550 bears against the rear wall of the pocket 220, 520. At this point the groove G in the pipe is complete. The tooth 270, 570 now rests in the cut groove G and resists the forces tending to separate the joint.

It is often necessary to remove the gland 210, 510 from a pipe after initial assembly. When this is necessary, the adjustment members are removed, oftentimes with an impact wrench. According to an embodiment of the present invention, the adjustment member 400 has a retention feature which prevents the adjustment member 400 from becoming lost. As the gripping element 240, 540 rotates back and the rear corner of the gripping element 240, 540 touches the pipe surface, the force required damages an imperfect thread 410 (FIG. 16A) located at the distal end 404 of the adjustment member 400. This prevents complete removal of the adjustment member 400 but allows the adjustment member 400 to function in resetting the gripping element 240, 540 against the pipe.

Figure 19A:
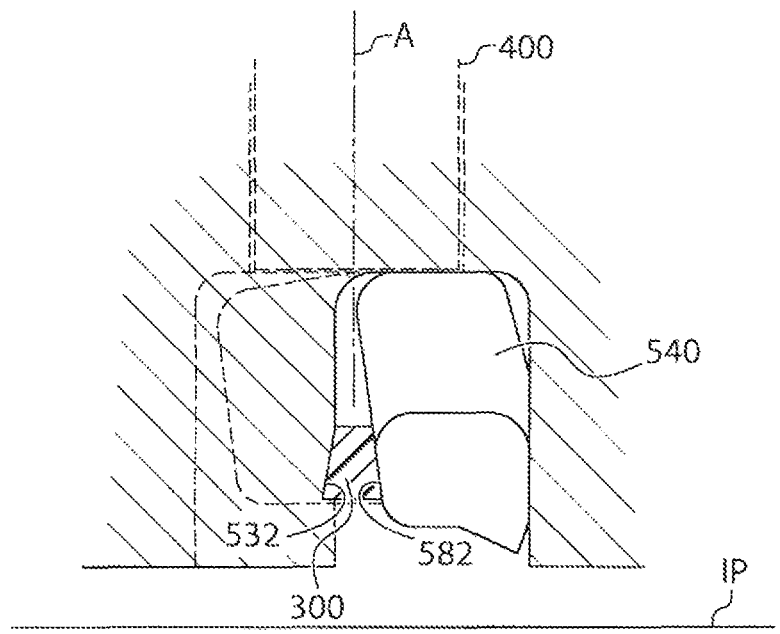
FIG. 19A illustrates a pipe gripping element according to some embodiments of the present invention prior to engagement with a pipe.

Referring back to FIG. 14B, the gripping element rear surface 582 and front surface 580 form a wedge shape. When the gripping element 540 is inserted fully into a pocket 520, the rear surface 532 of the pocket 520 in conjunction with rear surface 582 of the gripping element 540 (as well as the rear surface 528 of the pocket 520 in conjunction with rear surface 582 of the gripping element 540) form a wedge shaped cavity. A rubber wedge 300 is forced into the cavity between rear wall 532 of pocket 530 (FIG. 12) and gripping element rear surface 582 until the rubber wedge surface 302 is trapped in the wedge shaped recess 536 (FIG. 19A). At this point the rubber wedge 300 is fixed, i.e., cannot move, and retains the gripping element 540 in the pocket 520. The rubber wedge 300 also forces the gripping element 540 against the front surface 526 of the pocket 520. By virtue of the fact that in order to move out of the pocket 520, the gripping element 540 must compress the fixed rubber wedge 300, the gripping element is retained in position.

Figure 19B:
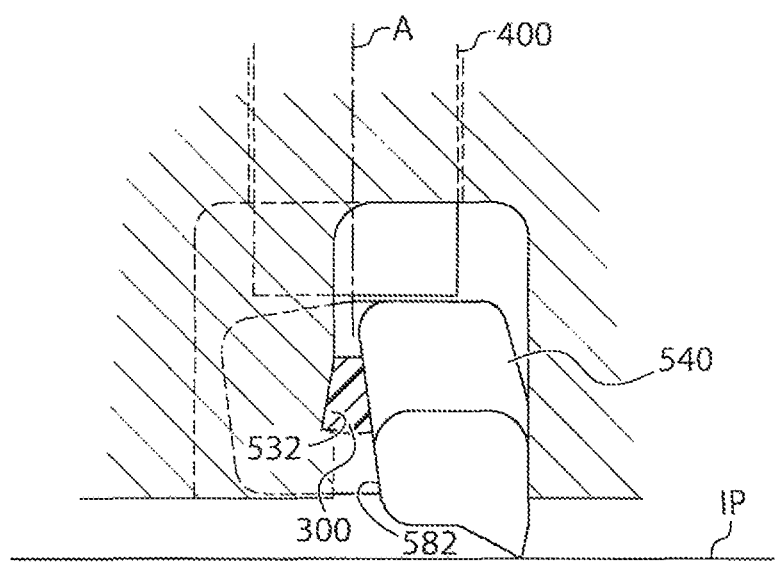
FIG. 19B illustrates the pipe gripping element of FIG. 19A engaged with a pipe.

Referring now to FIG. 19B, when torque is applied to the adjustment member 400, the flat end of the adjustment member 400 forces the gripping element 540 radially toward the pipe. The rubber wedge 300 remains fixed in position while gripping element surface 582 slides past the rubber wedge 300 and compresses it, creating additional force against the front surface 526. As the gripping element 540 rotates back until its rear corner rests against the pipe, the rubber wedge 300 remains in place and is further compressed to hold the gripping element in its proper location. This creates a stable contact for the edge of the flat end of the adjustment member 400 such that a greater force multiplier can be obtained.

When it is desired to remove the gland 510 from a pipe, the adjustment member 400 is threadingly retracted (i.e., unscrewed) and the gland 510 is rotated by hand in the circumferential direction. This causes the gripping element 540 to be forced radially into the pocket 520 and retained by the rubber wedge 300.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. A pipe joint restraint for coupling pipe ends in fluid communication and holding the pipes against separation, comprising:

an annular retainer gland defining a pipe-receiving space therethrough;

a plurality of T-shaped pockets formed within the gland in circumferential spaced-apart relationship, each pocket having an opening confronting the pipe-receiving space, each pocket comprising a top wall, a front wall, and first, second and third rear walls, wherein the second rear wall is centrally located such that the first and third rear walls are on respective opposite sides of the second rear wall, wherein the first rear wall comprises a recessed portion, and wherein the third rear wall comprises a recessed portion;

a plurality of T-shaped pipe gripping elements received in the pockets, each pipe gripping element comprising an elongated cross member and a base member extending from the cross member, wherein the cross member comprises a flat upper portion and an opposite lower arcuate portion, wherein the base member comprises a flat upper portion that is slanted relative to the cross member flat upper portion to define a fulcrum, and wherein an elongated, arcuate tooth extends outwardly from the arcuate portion;

first and second wedge members positioned between the cross member of each gripping element and the first and third rear walls of each pocket, respectively, wherein the first wedge member is received within the recessed portion of the first rear wall and the second wedge member is received within the recessed portion of the third rear wall, wherein the first and second wedge members are configured to retain a respective gripping element within a respective pocket and prevent the gripping element from becoming dislodged from the pocket; and a plurality of threaded adjustment members, each threadingly engaged with a respective pocket and each having a flat distal end operably associated with a respective gripping element at the fulcrum thereof and adapted to move the gripping element relative to the pocket.

2. The pipe joint restraint of claim 1, wherein each top wall comprises a threaded opening, and wherein a respective one of the threaded adjustment members is threadingly engaged with the threaded opening.

3. The pipe joint restraint of claim 1, wherein each threaded adjustment member comprises a deformable thread at a proximal end thereof, wherein the deformable thread is configured to deform during use of the pipe joint restraint such that each threaded adjustment member is non-removable from a respective pocket top wall.

4. The pipe joint restraint of claim 1, wherein the first and second wedge members comprise resilient material.

5. The pipe joint restraint of claim 1, wherein the arcuate portion of each gripping element has opposite front and rear edges, and wherein the elongated, arcuate tooth extends outwardly from the arcuate portion between the front and rear edges.

6. The pipe joint restraint of claim 1, wherein the cross member of each gripping element comprises opposite front and rear portions, wherein the base member extends outwardly from the cross member rear portion, wherein the cross member front portion comprises first and second wall portions that are slanted relative to each other, and wherein the second wall portion has a common edge with the cross member upper portion.

7. The pipe joint restraint of claim 1, wherein the cross member upper portion of each gripping element has a width greater than a width of the base member upper portion.

8. The pipe joint restraint of claim 1, wherein the cross member upper portion and the base member upper portion of each gripping element are each substantially planar.

9. The pipe joint restraint of claim 1, wherein the gland further includes a plurality of bolt holes for receiving bolts to fasten the gland to a flange of a member receiving an end of a pipe received in the pipe-receiving space of the gland.

10. The pipe joint restraint of claim 1, further comprising a projecting rim having a forward end edge for engaging a sealing member disposed within an internal annular recess of a fitting on a second pipe when the gland is installed on a first pipe.

11. The pipe joint restraint of claim 1, wherein a peripheral edge of the distal end of each respective threaded adjustment member, upon initial contact with a respective gripping element cross member, creates a first center of rotation of the gripping element, and wherein the fulcrum creates a second center of rotation of the gripping element upon subsequent contact with the flat distal end of the adjustment member.

\* \* \* \* \*